United States Patent [19]
Poplingher et al.

[11] Patent Number: 5,987,599
[45] Date of Patent: *Nov. 16, 1999

[54] TARGET INSTRUCTIONS PREFETCH CACHE

[75] Inventors: Mircea Poplingher, Campbell; Tse-Yu Yeh, Milpitas, both of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/827,296

[22] Filed: Mar. 28, 1997

[51] Int. Cl.$^6$ .................................................. G06F 9/38
[52] U.S. Cl. ............................................................ 712/238
[58] Field of Search ................................... 395/587, 586, 395/395, 584, 585; 712/237, 238, 239, 240, 219

[56] References Cited

U.S. PATENT DOCUMENTS

| | | | |
|---|---|---|---|
| 4,974,154 | 11/1990 | Matsuo | 712/240 |
| 5,136,697 | 8/1992 | Johnson | 712/239 |
| 5,265,213 | 11/1993 | Weiser et al. | 712/240 |
| 5,287,467 | 2/1994 | Blaner et al. | 712/235 |
| 5,623,614 | 4/1997 | Van Dyke et al. | 712/240 |
| 5,623,615 | 4/1997 | Salem et al. | 712/238 |
| 5,734,881 | 3/1998 | White et al. | 712/238 |
| 5,815,699 | 9/1998 | Puziol et al. | 712/239 |

OTHER PUBLICATIONS

Perleburg, Chris H. et al.; "Branch Target Buffer Design and Optimization"; IEEE Transactions on Computers; pp. 396–412, Apr. 1993.

*Primary Examiner*—Zarni Maung
*Assistant Examiner*—Kenneth R. Coulter
*Attorney, Agent, or Firm*—Blakely, Sokoloff, Taylor & Zafman LLP

[57] ABSTRACT

A processor that includes an execution pipeline that executes a programmed flow of instructions is provided. The processor also includes an instruction pointer generator configured to generate an instruction pointer. Furthermore, the processor includes a branch prediction circuit configured to receive the instruction pointer. In response to the instruction pointer, the branch prediction circuit is configured to determine if an instruction corresponding to the instruction pointer includes a branch that is predicted taken and if so to provide to said execution pipeline a target instruction corresponding to said instruction. The branch prediction circuit provides to the execution pipeline at least one target instruction corresponding to the instruction corresponding to the instruction pointer.

23 Claims, 4 Drawing Sheets

TARGET INSTRUCTIONS PREFETCH CACHE

BACKGROUND OF THE INVENTION

1. Field of the Invention

The present invention generally relates to the field of microprocessors. More specifically, the present invention relates to an apparatus and a method for performing branch predictions in a microprocessor.

2. Description of Related Art

State-of-the-art microprocessors often employ pipelining to enhance performance. Within a pipelined microprocessor, functional units necessary for executing different stages of an instruction are operated simultaneously on multiple instructions to achieve a degree of parallelism leading to performance increases over non-pipelined microprocessors. As an example, an instruction fetch unit, an instruction decode unit and an instruction execution unit of a pipelined microprocessor may operate simultaneously. During one clock cycle, the instruction execution unit executes a first instruction while the instruction decode unit decodes a second instruction and the fetch unit fetches a third instruction. During a next clock cycle, the execution unit executes the newly decoded instruction while the instruction decode unit decodes the newly fetched instruction and the fetch unit fetches yet another instruction. In this manner, neither the fetch unit nor the decode unit need wait for the execution unit to execute the last instruction before processing new instructions. In state-of-the-art microprocessors, the steps necessary to fetch and execute an instruction are sub-divided into a larger number of stages to achieve a deeper degree of pipelining.

A pipelined microprocessor operates most efficiently when instructions are executed in the sequence in which the instructions appear in memory. However, such is typically not the case. Rather, computer programs typically include a large number of branch instructions which, upon execution, may cause instructions to be executed in a sequence other than as the sequence set forth in memory. More specifically, when a branch instruction is executed, execution continues either with the next sequential instruction from memory or execution jumps to an instruction specified at a "branch target" address. The branch specified by the instruction is said to be "Taken" if execution jumps and "Not Taken" if execution continues with the next sequential instruction from memory.

Branch instructions are either unconditional or conditional. An unconditional branch is Taken every time the instruction is executed. A conditional branch instruction is Taken or Not Taken depending upon resolution of a condition such as a logic statement. Instructions to be executed following a conditional branch are not known with certainty until the condition upon which the branch depends has been resolved. However, rather than wait until the condition is resolved, state-of-the-art microprocessors perform branch prediction whereby the microprocessor tries to determine whether the branch will be Taken or Not Taken and, if Taken, to predict or otherwise determine the target address for the branch. If the branch is predicted to be Not Taken, the microprocessor fetches and speculatively executes the next instruction in memory. If the branch is predicted to be Taken, the microprocessor fetches and speculatively executes the instruction found at the predicted branch target address. The instructions executed following the branch prediction are "speculative" because the microprocessor does not yet know whether the prediction will be correct or not. Accordingly, any operations caused to be performed by the speculative instructions cannot be fully completed. For example, if a memory write operation is performed speculatively, the write operation cannot be forwarded to external memory until all previous branch conditions are resolved otherwise the instruction may improperly alter the contents of the memory based on a mispredicted branch.

If the branch prediction is ultimately determined to be correct, the speculatively executed instructions are retired or otherwise committed. For the example of a memory write retired, the write operation is forwarded to external memory. If the branch prediction is ultimately found to be incorrect, then any speculatively executed instructions following the mispredicted branch are typically flushed from the system. For the memory write example, the write is not forwarded to external memory but rather is discarded.

To expedite branch prediction, some state-of-the-art microprocessors include a branch prediction table (BPT) which provides a cache of the most recently predicted branches along with corresponding prediction information such as a brief history of previous executions and/or predictions for that branch and the success thereof. In one embodiment of a pipelined microprocessor that has a branch prediction circuit that incorporates a BPT, an Instruction Pointer Generator (IPG) generates an instruction pointer specifying a new instruction to BPT and to an Instruction Cache (IC) which stores instructions. In many implementations of pipeline microprocessors, the BPT is accessed using a tag value provided within the instruction pointer and corresponding to tag values employed by the IC for identifying cache lines therein.

The branch prediction circuit may also include a Target Address Cache (TAC) which includes addresses of target instructions where a branch may be taken if the BPT predicts that a branch is taken. The IPG also drives the instruction pointer to the TAC. If a branch is determined to be taken, the TAC drives an address of a target instruction (target address) to the instruction pointer generator (IPG). The target address driven by the TAC to the IPG is decoded and then used as a regular instruction pointer to fetch a corresponding target instruction from the IC. In such a way, a fetch unit that may include the IC, restarts fetching instructions from the new target address.

However, for microprocessors operating at higher speeds "pipeline bubbles" may occur due to the fact that the speed of the microprocessor does not afford the fetching of a target instruction in the next pipeline stage after the issuance of the instruction pointer and the propagation time of the target address through the IPG. In the example described herein, the instruction pointer is generated in the first stage and a result of a determination of "branch taken" is generated during the second stage due to the time it takes to determine whether a branch is taken. A "pipeline bubble" is defined as a pipeline stage during which the result of the operation of a functional unit of the pipeline is later discarded (flushed) by the microprocessor as not being meaningful.

A "pipeline bubble," for example, may occur if the IPG does not timely receive information from the BPT, indicating that a branch is taken, before the beginning of the second pipeline stage to redirect the instruction stream to the target instruction in the second pipeline stage. In conventional microprocessors, the IPG generates a new instruction pointer in the second pipeline stage, by incrementing the previous instruction pointer. The instruction pointer generated by the IPG in the second pipeline stage is meaningless for the sequence of instructions the microprocessor executes, as the correct instruction's pointer should point to the target instruction and not to an instruction following the instruction the pointer therewith was generated in the first stage. A "pipeline bubble" thus occurs at the instruction pointer generation stage in the second stage. In the third pipeline stage, the bubble propagates to the IC as the instruction fetched from the IC in the third pipeline stage, most likely, is not the target instruction. Only in a fourth pipeline stage a target instruction fetched from the IC is made available to a pipeline execution circuit.

The introduction of a one-cycle "pipeline bubble" into the pipeline causes a one-cycle penalty for every branch correctly predicted taken. Hence, it is desirable to provide a method and apparatus for providing a target instruction to an execution pipeline circuit without incurring a one-cycle penalty for every branch correctly predicted taken due to the introduction of a pipeline "bubble" in the pipeline stages when a branch is predicted taken.

SUMMARY OF THE INVENTION

The present invention provides a processor that includes an execution pipeline that executes a programmed flow of instructions. The processor also includes an instruction pointer generator configured to generate an instruction pointer. Furthermore, the processor includes a branch prediction circuit configured to receive the instruction pointer. In response to the instruction pointer, the branch prediction circuit is configured to determine if an instruction corresponding to the instruction pointer includes a branch that is predicted taken. The branch prediction circuit is configured to provide to the execution pipeline at least a target instruction corresponding to the instruction corresponding to the instruction pointer.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
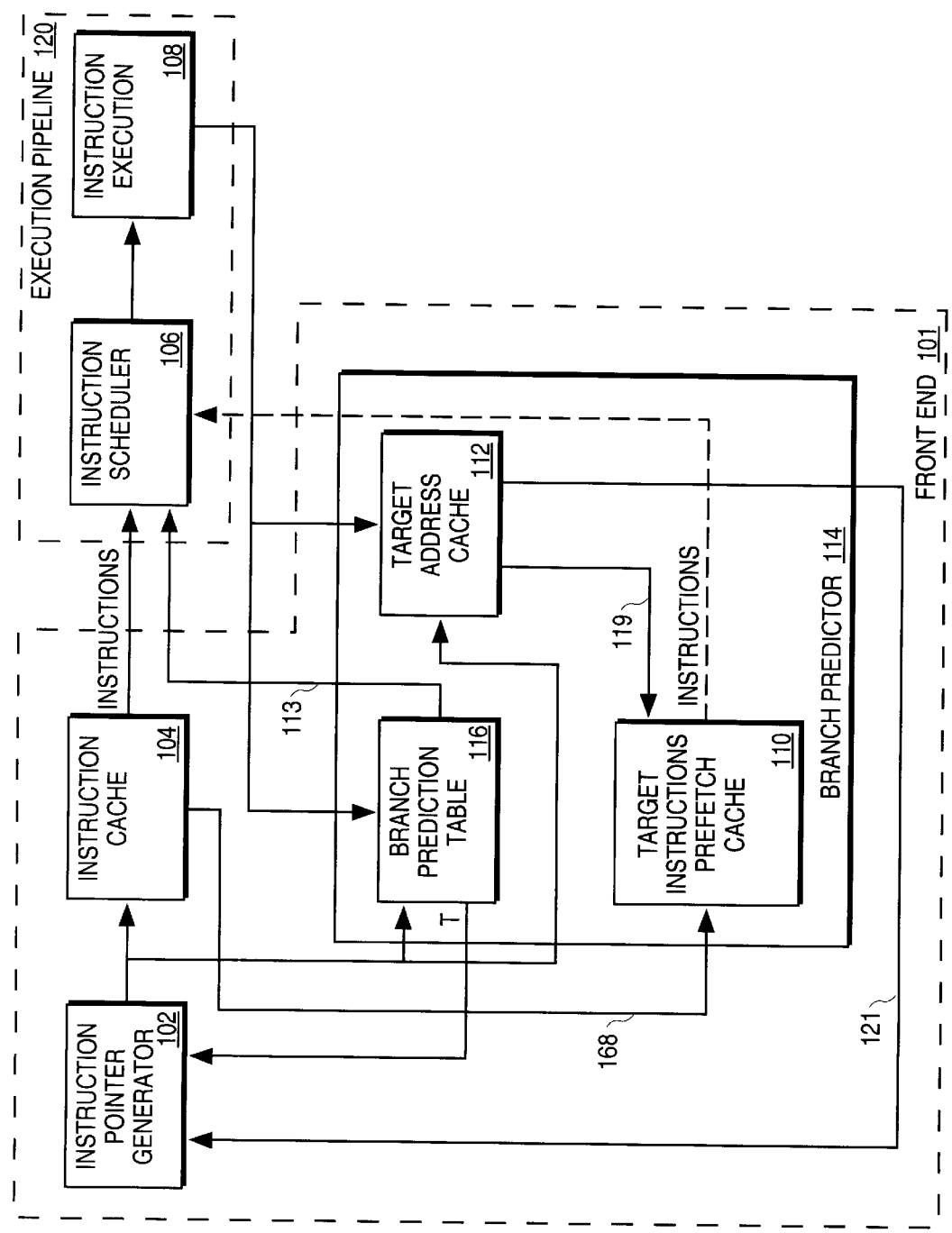
FIG. 1 illustrates a block diagram of a front end of a pipelined or superpipelined microprocessor.

FIG. 1 illustrates a block diagram of a pipelined or superpipelined microprocessor including front end 101 and execution pipeline 120. The microprocessor is configured to execute instructions that are typically stored in a system memory (not shown) at specified addresses. Part of the instructions stored in the system memory are also stored in Instruction Cache (IC) 104 which may be part of an Instruction Fetch Unit (not shown). In one embodiment, according to the present invention, IC 104 stores two instructions per cache line, but the present invention is not limited in scope to this implementation.

An Instruction Pointer Generator (IPG) 102 drives an instruction pointer to IC 104 for fetching an instruction therefrom. The instruction pointer includes an address of a next instruction to be executed by an execution pipeline circuit 120. The instruction pointer typically includes a tag value according to which an Instruction Fetch Unit (not shown) accesses IC 104. Once an instruction is fetched, the instruction is driven to an instruction scheduler 106 (also known as "instruction dispatch") of execution pipeline circuit 120. In one embodiment, according to the present invention, 4 cache lines may be driven in parallel from IC 104 to execution pipeline circuit 120 but the present invention is not limited in scope in this respect.

Front end 101 further includes branch predictor circuit 114 that receives the instruction pointer from IPG 102 and performs branch predictions based upon branch history information stored in branch prediction table (BPT) 116. In one embodiment according to the present invention described herein, BPT 116 is accessed using a tag value provided within the instruction pointer and corresponding to tag values employed by IC 104 for identifying cache lines stored therein.

While an instruction corresponding to the instruction pointer is fetched from IC 104, BPT 116 determines whether previous branch predictions and executions information for a same instruction is included within its cache lines. BPT 116 also determines whether a heuristic predicts the current branch as being "taken." In response to this determination, BPT 116 generates a Branch Taken signal (hereinafter "T") if previous branch predictions and executions information is included within its cache lines and a branch is predicted taken. If the prediction is "NOT TAKEN," an instruction increment unit (not shown) is activated to increment the instruction pointer to point to a next sequential instruction following the instruction to which the current instruction pointer points.

IPG 102 also drives the instruction pointer to a target address cache (TAC) 112 which includes addresses of target instructions at which specific branches are taken. TAC 112 determines whether a corresponding target address is included therein. If the target address is included in TAC 112, the target address is driven via line 119 to Target Instructions Prefetch Cache (TIPC) 110 according to the present invention and via line 121 to IPG 102.

TIPC 110 is a cache device configured to store target instructions corresponding to target addresses to which the execution of a set of instructions is redirected if a branch condition included in a branch instruction is met. Target instructions may be prefetched to TIPC 110 from the system memory to be written into TIPC 110 when IC 104 requests instructions from the system memory due to cache misses. Based on the target address, TIPC 110 determines whether at least one target instruction corresponding to the target address is stored therein and if such is the case, it drives the target instruction to instruction scheduler 106 of pipeline execution circuit 120. One cache line may store more than at least one target instruction. In the following discussion the present invention will be explained in connection with a TIPC that has one target instruction per cache line. Instruction scheduler 106 includes logic (not shown) according to which it selects the target instruction and further drives it to an instruction execution unit 108, if a branch is predicted taken and the TIPC 110 stores a corresponding target instruction.

Note that by way of TIPC 110, branch predictor circuit 114 drives a target instruction directly to instruction scheduler 106, rather than driving a target address via line 121 to IPG 102 for generating an instruction pointer thereby causing a fetching of the at least target instruction from IC 104. The use of TIPC 110, as described above, reduces the time otherwise required for fetching a target instruction to instruction scheduler 106. For example, in the embodiment illustrated in FIG. 1, a target instruction is provided to the Instruction Scheduler 106 in a third pipeline stage and not a fourth pipeline stage as may be the case with conventional branch prediction circuits. Due to a smaller size of TIPC 110 (16 cache lines) relative to IC 104 (1 K cache lines) an access time to TIPC 110 is substantially lower than an access time to IC 104 thereby the present invention providing a faster way to fetch target instructions to execution pipeline circuit 120. Note that while TAC 112 and TIPC 110 are shown as separate caches, these two caches may be incorporated in one single cache. In one embodiment of the present invention, TIPC 110 may be made up of one or more buffers (target instructions prefetch buffers—TIPB) but the present invention is not limited in scope to this specific implementation.

Figure 2:
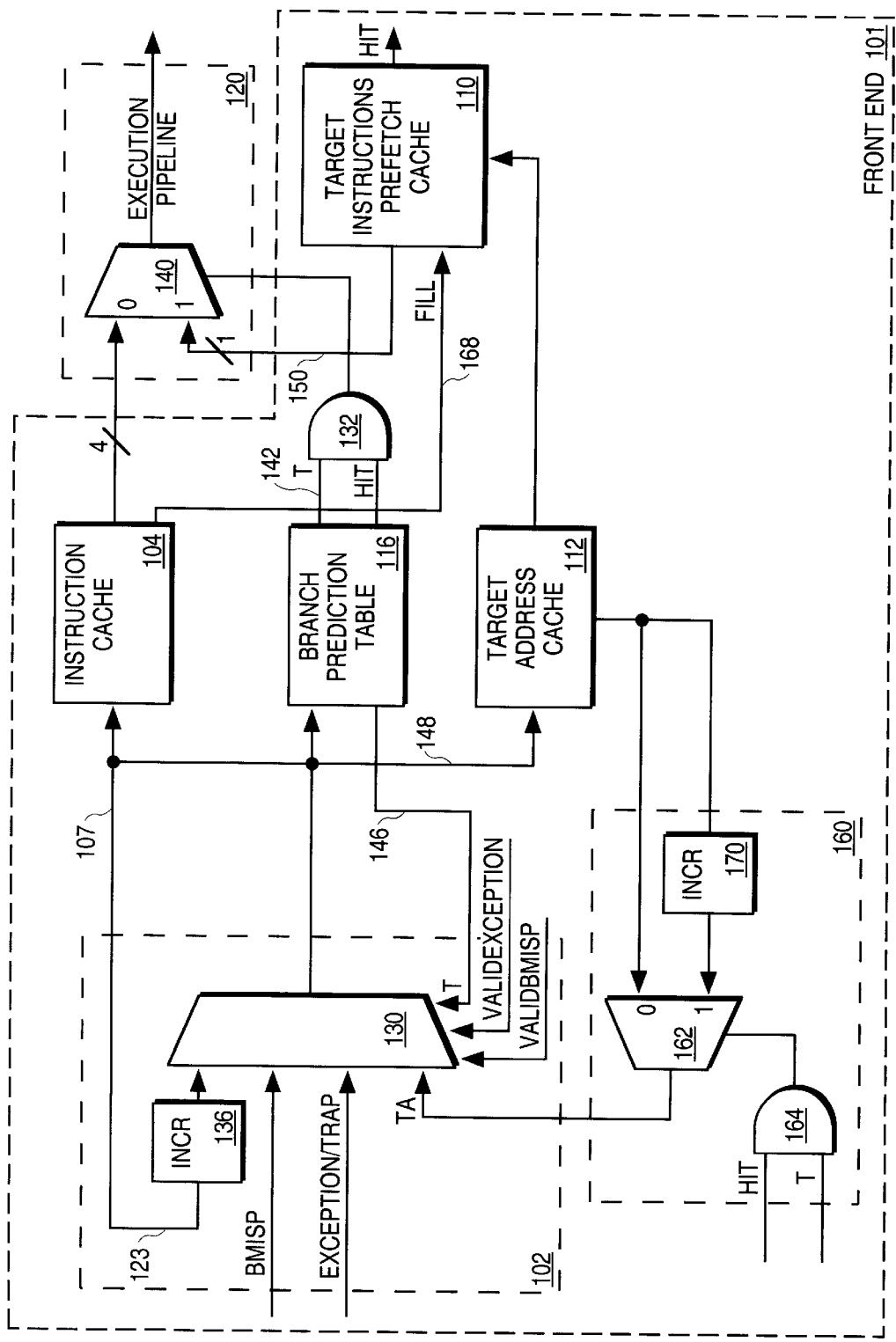
FIG. 2 illustrates a detailed block diagram of the front end of the microprocessor illustrated in FIG. 1.

FIG. 2 illustrates a detailed block diagram of the front end 101 of the microprocessor illustrated in FIG. 1 coupled to execution pipeline circuit 120. Front end 101 includes instruction pointer generator (IPG) 102 which generates, in a first pipeline stage, an instruction pointer to Instruction Cache (IC) 104, BPT 116, and TAC 112. IPG 102 includes a first selecting device (multiplexor 130) which receives at its input several instruction address signals. In the embodiment described herein, the instruction address signals have 64 bits but the present invention is not limited in scope to this implementation. One of these address signals may be selected by multiplexor 130 depending on logic values of control signals T, VALID BMISP, and VALID EXCEPTION received by multiplexor 130. A selected signal is then decoded by IPG 102 and driven to IC 104.

Multiplexor 130 is configured to prioritize the instruction address signals input thereto according to the following scheme. First priority is conferred to an EXCEPTION/TRAP instruction address signal driven from a back end (not shown) of the microprocessor. Second priority is given to a BRANCH MISPREDICTION (BMISP) instruction address signal also driven from the back end of the microprocessor. A third priority is conferred to a target (instruction) address signal driven to multiplexor 130 by Target Address Cache (TAC) 112 via a logic circuit 160. Fourth priority is conferred to a signal (an incremented instruction pointer) generated by incrementor 136. Incrementor 136 receives a current instruction pointer from an output of multiplexor 130 and increments the current instruction pointer thereby causing the instruction pointer to point to a next instruction following the instruction to which the current instruction pointer points. According to this priority scheme, if signals VALID BMISP and VALID EXCEPTION/TRAP are not asserted, and a branch is predicted taken, causing signal T (prediction taken) to be asserted, multiplexor 130 selects and drives to an output thereof the target address signal. Signals BMISP and EXCEPTION/TRAP include a Valid bit (VALID EXCEPTION and VALID BMISP respectively) which indicates whether the respective signal is valid.

During a second pipeline stage, an instruction corresponding to the instruction pointer is fetched from IC 104, if this device includes such entry. Also, during the second pipeline stage, BPT 116 determines whether the instruction corresponding to the instruction pointer is a branch instruction. BPT 116 also checks a branch history to determine whether a branch is predicted taken. If a branch is predicted taken, BPT 116 generates signal T via line 146 to multiplexor 130 of IPG 102. BPT 116 also generates signal T to AND gate 132. In the same pipeline stage, TAC 112 determines whether it stores therein an entry corresponding to the instruction pointer.

If a target address corresponding to the instruction pointer is included in TAC 112, this device generates a target address signal to IPG 102 via logic circuit 160. TAC 112 also generates the target address signal to Target Instructions Prefetch Cache (TIPC) 110. If TIPC 110 includes the target instruction corresponding to the target address driven thereto, TIPC 110 drives this target instruction to an input, a second selecting device (multiplexor 140) of an instruction scheduler of execution pipeline circuit 120. TIPC 110 also generates a signal HIT to AND gate 132, which performs and AND logic operation between the HIT signal and the T signal thereby generating at an output thereof a control signal to multiplexor 140. The HIT signal is also driven to AND gate 164 of logic 160.

If both the HIT and the T signals are asserted AND gate 164 generates a logic "1" signal to a control gate of multiplexor 162. Multiplexor 162 receives at its inputs a target address signal from TAC 112 and an incremented target address signal generated by incrementor 170. Incrementor 170, increments the target address, so that its output generates a "next" succeeding target address. In response to the control signal driven thereto by AND gate 164, multiplexor 162 generates at an output thereof a signal indicating a target address based on which instruction pointer generator 102 is configured to generate a new instruction pointer to IC 104.

Assume a branch is predicted taken, but TIPC 110 does not store therein a target instruction corresponding to the target address retrieved from TAC 112. In this case, the HIT signal is deasserted and causes multiplexor 162 to select at an output thereof the target address driven by TAC 112 to a "0" input of multiplexor 162. The target address is then driven by multiplexor 162 to an input of multiplexor 130. Multiplexor 130 generates an instruction pointer based on the target address and drives this instruction pointer to its output, if the T signal is asserted and the VALID EXCEPTION and VALID BMISP are deasserted. A target instruction corresponding to the target address is fetched from IC 104 and is further driven to multiplexor 140. Multiplexor 140 selects the target instruction from IC 104 at an output thereof as the deasserted HIT signal causes AND gate 132 to generate a "0" logic control signal to multiplexor 140. Also, since TIPC does not store therein the respective target instruction, IC 104 also provides the target instruction via line 168 to TIPC 110 which writes it in one of the cache lines thereof.

However, if TIPC 110 includes therein a target instruction corresponding to the target address, TIPC 110 drives the target instruction to an input of multiplexor 140. Multiplexor 140 selects at an output thereof the target instruction from TIPC 110, as the control signal generated by AND gate 132 is asserted (both the T and the HIT signals are asserted). Also, if the target instruction is stored in TIPC 110, multiplexor 162 of logic 160 selects an incremented target address to an output thereof as the control signal driven thereto by AND gate 164 is asserted. The incremented target address is driven to multiplexor 130 of IPG 102 which selects the target address (TA) signal. Based on the target address signal, IPG 102 generates an instruction pointer to IC 104. Hence, in fourth pipeline stage, IC 104 fetches to execution pipeline circuit 120 an instruction that sequentially follows the target instruction.

Figure 3:
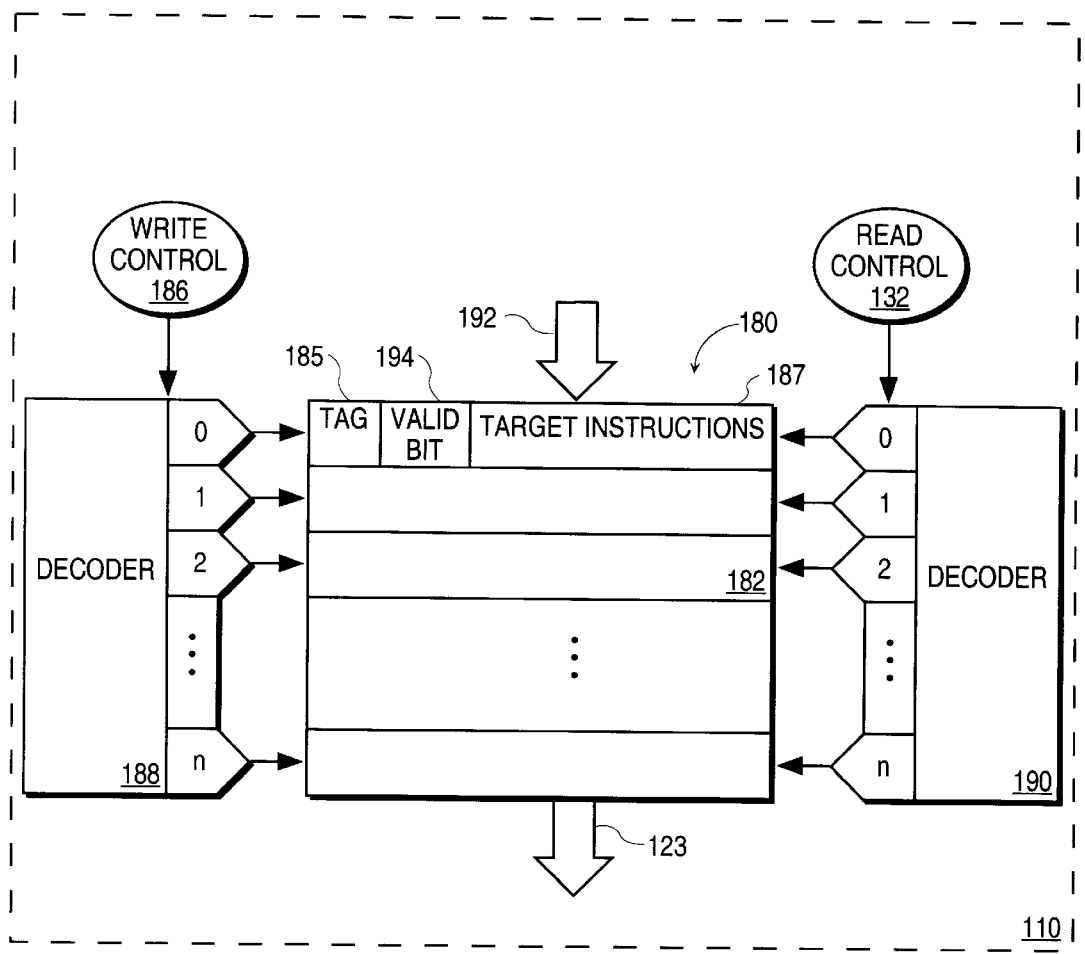
FIG. 3 illustrates one embodiment of a target instructions prefetch cache according to the present invention.

FIG. 3 illustrates one embodiment of a TIPC 110 according to the present invention. TIPC 110 includes a storage area 180 configured to store cache lines 182. Each cache line 182 includes a tag 185, a valid bit 194, and at least one target instruction 187. In one embodiment according to the present invention TIPC 180 has 16 cache lines that may store two instruction bundles per line. Valid bit 186 indicates whether a cache's entry (the target instruction) is valid or not for the prediction. Logically, TIPC 110 may be a structural extension of the TAC of FIGS. 1 and 2. For each entry in the TAC there is a corresponding entry in the TIPC 110. A TIPC cache line is invalidated when its associated target address cache entry is altered, but the cache line has not been written to. The TIPC 110 further includes READ and WRITE control logic 132 and 186 respectively for reading from or writing to TIPC 110. When an instruction is read from TIPC 110 the read control logic 132 causes the respective instruction to be driven to an instruction scheduler via lines 123. For write operations, the write control logic 186 forwards to TIPC 110 an instruction, via line 192, from an instruction cache or from an external cache or memory (not shown).

Figure 4:
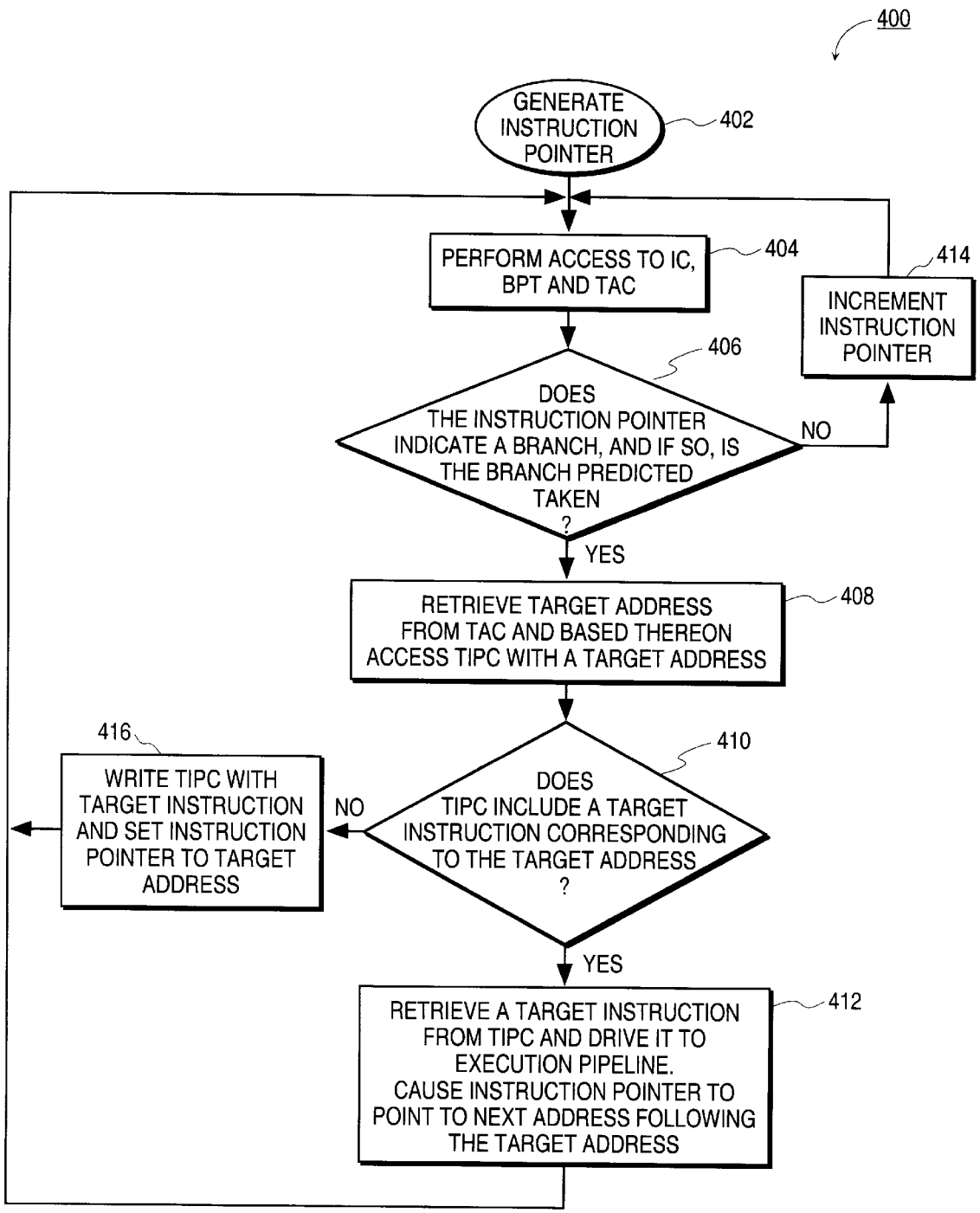
FIG. 4 illustrates a flow chart diagram of an embodiment of a process for prefetching target instructions in a microprocessor implementing a branch prediction mechanism according to the present invention.

FIG. 4 illustrates a flow chart diagram 400 of an embodiment of a process for prefetching target instructions in a microprocessor implementing a branch prediction mechanism according to the present invention. Initially, at step 402 an instruction pointer generator (IPG) generates an instruction pointer. The process flows to step 404 where an instruction cache (IC), a branch prediction table (BPT) and a target address cache (TAC) are accessed with the instruction pointer generated at step 402. At decision block 406 it is determined whether the instruction corresponding to the instruction pointer is a branch instruction. Also, if the instruction is a branch instruction, it is determined whether a branch is predicted taken. If the instruction pointer indicates no branch instruction or if the branch is predicted not taken the process flows to block 414, where the instruction pointer is incremented to point to a next address, from where the process flows to block 404. If a branch is predicted taken the process flows to block 408 where a target address is retrieved from the TAC and based thereon a Target Instructions Prefetch Cache (TIPC) is accessed with the target address. The process further flows to block 410 where it is determined whether the TIPC includes a target instruction corresponding to the target address. If so, the process flows to block 412 where a target instruction is retrieved from the TIPC and is driven to an execution pipeline circuit. Also the IPG is caused to generate a pointer that points to a next sequential instruction following the target instruction. The process then flows to block 404. However, if at decision block 410, it is determined that the TIPC does not include a target instruction, then at block 416 the IPG is set to the target address and the TIPC is written with the target instruction. The process then flows to block 404. In another embodiment according to the present invention, TIPC can be accessed with the same instruction pointer at the same time as the BPT and TAC. TIPC may include a logic that may determine if a target instruction corresponding to the instruction pointer driven thereto corresponds to a target address retrieved from the TAC.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A processor comprising:
    an execution pipeline to execute a programmed flow of instructions;
    an instruction pointer generator (IPG) to generate an instruction pointer;
    a branch predictor circuit including a target address cache (TAC) device, that stores target addresses, and a target instructions prefetch cache (TIPC) device, that stores target instructions, said TAC configured to receive said instruction pointer and responsive thereto to provide a target address to said TIPC; and
    a selecting device to receive an instruction corresponding to said instruction pointer and at least one target instruction corresponding to said target address, said selecting device providing said target instruction to said execution pipeline if an instruction corresponding to said instruction pointer includes a branch predicted taken.

2. The processor of claim 1 wherein said branch predictor circuit includes a branch prediction table (BPT) to receive said instruction pointer and responsively to determine if an instruction corresponding to said instruction pointer includes a branch that is predicted taken.

3. The processor of claim 1 wherein said branch predictor circuit includes a target address selection circuit, coupled to said TAC and to said TIPC, configured to provide to said IPG one of a target address and an incremented target address.

4. The processor of claim 3 wherein said target address selection circuit includes an incrementor with an output and an input coupled to said TAC.

5. The processor of claim 4 wherein said target address selection circuit further includes a multiplexor having a first input coupled to said TAC and a second input coupled to said output of said incrementor.

6. The processor of claim 1 wherein said TIPC includes at least one Target Instructions Prefetch Buffer (TIPB).

7. The processor of claim 1 wherein said TIPC includes at least one Target Instructions Prefetch Buffer (TIPB).

8. In a microprocessor including a branch predictor and an execution pipeline, a method for supplying instructions to said execution pipeline, the method comprising the steps of:
    (a) generating an instruction pointer;
    (b) determining whether an instruction corresponding to said instruction pointer is a branch instruction and if so determining if a branch is predicted taken;
    (c) supplying to a Target Instruction Prefetch Cache (TIPC) a target address and supplying to said execution pipeline, by said branch predictor, at least one target instruction corresponding to said target address if said branch is predicted taken; and
    (d) supplying to said execution pipeline an instruction corresponding to said instruction pointer if said branch is not predicted taken.

9. The method of claim 8 wherein said step (c) further includes the step of determining whether a first storage device, in said branch predictor, stores said instruction.

10. The method of claim 9 further including the step of causing said instruction pointer to point to an address where said target instruction is stored if said at least one first storage device does not store said instruction.

11. The method of claim 10 further including fetching from a second storage device said instruction based on said instruction pointer.

12. A processor comprising:
   an execution pipeline that executes a programmed flow of instructions;
   an instruction pointer generator (IPG) to generate an instruction pointer;
   a target address cache (TAC) device that stores target addresses, and a target instructions prefetch cache (TIPC) device that stores target instructions, said TAC configured to receive said instruction pointer and responsive thereto to retrieve a target address; and
   a selecting device to receive an instruction corresponding to said instruction pointer and at least one target instruction, said selecting device providing said target instruction to said execution pipeline if an instruction corresponding to said instruction pointer includes a branch predicted taken.

13. The processor of claim 12 wherein said TAC and said TIPC included in a branch predictor circuit (BPC) configured to receive said instruction pointer and responsively to determine if an instruction corresponding to said instruction pointer includes a branch that is predicted taken.

14. The processor of claim 13 wherein said branch predictor circuit includes a Branch Predictor Table (BPT) configured to receive said instruction pointer and responsively to determine if an instruction corresponding to said instruction pointer includes a branch that is predicted taken.

15. The processor of claim 13 wherein said branch predictor circuit includes a target address selection circuit, coupled to said TAC and to said TIPC, to generate to said IPG one of a target address and an incremented target address.

16. The processor of claim 15 wherein said target address selection circuit includes an incrementor with an output and an input coupled to said TAC.

17. The processor of claim 16 wherein said target address selection circuit further includes a multiplexor having a first input coupled to said TAC and a second input coupled to said output of said incrementor.

18. The processor of claim 12 wherein said instruction select device of said execution pipeline is configured to select at an output thereof a target instruction from said TIPC if a branch is predicted taken.

19. A processor comprising:
   an execution pipeline to execute a programmed flow of instructions;
   an instruction pointer generator (IPG) to generate an instruction pointer;
   a branch predictor circuit including a target address cache (TAC) device, that stores target addresses, and a target instructions prefetch cache (TIPC) device, that stores target instructions for both short and long branches, said TAC configured to receive said instruction pointer and responsive thereto to provide a target address to said TIPC; and
   a selecting device to receive an instruction corresponding to said instruction pointer and at least one target instruction corresponding to said target address, said selecting device providing said target instruction to said execution pipeline if an instruction corresponding to said instruction pointer includes a branch predicted taken.

20. The processor of claim 19 wherein said branch predictor circuit includes a target address selection circuit, coupled to said TAC and to said TIPC, configured to provide to said IPG one of a target address and an incremented target address.

21. The processor of claim 20 wherein said target address selection circuit includes an incrementor with an output and an input coupled to said TAC.

22. The processor of claim 21 wherein said target address selection circuit further includes a multiplexor having a first input coupled to said TAC and a second input coupled to said output of said incrementor.

23. The processor of claim 19 wherein said TIPC includes at least one Target Instructions Prefetch Buffer (TIPC).

* * * * *